United States Patent
Hwang et al.

(10) Patent No.: US 7,877,067 B2
(45) Date of Patent: Jan. 25, 2011

(54) METHOD FOR SELECTING RECEIVER MODE OF MOBILE TERMINAL WITH TWO RECEIVERS

(75) Inventors: Bo Seung Hwang, Yongin-si (KR); Joo Yong Park, Seongnam-si (KR); Young Cheol Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 587 days.

(21) Appl. No.: 11/870,816

(22) Filed: Oct. 11, 2007

(65) Prior Publication Data
US 2008/0090606 A1    Apr. 17, 2008

(30) Foreign Application Priority Data
Oct. 16, 2006    (KR) .......................... 2006-0100288

(51) Int. Cl.
H04B 17/00    (2006.01)
H04B 17/02    (2006.01)

(52) U.S. Cl. .................... 455/132; 455/67.13; 455/133; 455/226.2

(58) Field of Classification Search .............. 455/66.11, 455/67.13, 132–136, 226.1–226.4, 552.1–553.1; 375/346–349
See application file for complete search history.

(56) References Cited

U.S. PATENT DOCUMENTS

| | | | |
|---|---|---|---|
| 5,396,645 A | * | 3/1995 | Huff ........................... 455/441 |
| 5,566,364 A | * | 10/1996 | Mizoguchi et al. .......... 455/132 |
| 5,740,526 A | * | 4/1998 | Bonta et al. ............... 455/277.2 |
| 6,141,536 A | * | 10/2000 | Cvetkovic et al. ............. 455/45 |
| 6,332,072 B1 | * | 12/2001 | Johnson et al. .......... 455/277.1 |
| 6,678,508 B1 | * | 1/2004 | Koilpillai et al. ............. 455/137 |
| 7,024,168 B1 | | 4/2006 | Gustafsson et al. |
| 7,035,664 B2 | | 4/2006 | Kim |
| 7,277,679 B1 | * | 10/2007 | Barratt et al. ................ 455/101 |
| 2004/0253955 A1 | | 12/2004 | Love et al. |
| 2005/0255815 A1 | * | 11/2005 | Hammerschmidt et al. . 455/132 |

FOREIGN PATENT DOCUMENTS

| | | |
|---|---|---|
| CN | 1416287 | 5/2003 |
| WO | WO 01/59945 | 8/2001 |
| WO | WO 2004/047309 | 6/2004 |

* cited by examiner

*Primary Examiner*—Simon D Nguyen
(74) *Attorney, Agent, or Firm*—The Farrell Law Firm, LLP

(57) ABSTRACT

Provided is a method for selecting a receiver mode of a mobile terminal having two receivers and that can receive a signal using either or both of the two receivers depending on a channel environment. A method for selecting a receiver mode of a wireless communication terminal having at least two receivers includes computing at least one parameter for determining the receiver mode from a received signal; comparing the at least one parameter with a preset threshold; and selecting one only of a single receiver mode in which either of the two receivers is activated and a dual receiver mode in which both of the receivers are activated according to the comparison result. The method enables a receiver mode to switch between single and dual receiver modes adaptively according to a wireless environment, thus achieving stable signal reception without compromising reception sensitivity.

8 Claims, 2 Drawing Sheets

METHOD FOR SELECTING RECEIVER MODE OF MOBILE TERMINAL WITH TWO RECEIVERS

PRIORITY

This application claims priority to an application entitled "METHOD FOR SELECTING RECEIVER MODE OF MOBILE TERMINAL WITH TWO RECEIVERS" filed in the Korean Intellectual Property Office on Oct. 16, 2006 and assigned Ser. No. 2006-0100288, the contents of which are incorporated herein by reference.

BACKGROUND OF THE INVENTION

1. Field of the Invention

The present invention relates to a mobile terminal, and, more particularly, to a method for selecting a receiver mode of a mobile terminal having two receivers and that is designed to receive a signal using either or both of the receivers depending on a channel environment.

2. Description of the Related Art

In general, Wireless Broadband ('WiBro') refers to a broadband wireless Internet technology that can provide high-speed Internet services under stationary or mobile environments, almost anytime and anywhere. WiBro uses the 2.3 GHz frequency band with a cell radius of up to 1 Km to support mobility at more than 60 Km/H, guaranteeing seamless Internet connectivity. Further, WiBro supports high-speed data transmission, thus allowing Internet access at lower cost than is available on cellular networks.

In the recent years, a mobile terminal having two receivers (herein a Dual-receiver mobile terminal) has been proposed to provide broadband services under adverse channel conditions. The dual-receiver mobile terminal activates one of the two receivers under good channel conditions, and both receivers when it moves to a location with bad channel conditions, thus providing improved reception.

A conventional dual-receiver mobile terminal may operate in a single receiver mode where only one of the two receivers is activated or in a dual receiver mode where both the receivers are activated depending on periodically measured Carrier to Interference plus Noise Ratio ('CINR') and Received Signal Strength Indicator ('RSSI').

In other words, the conventional dual-receiver mobile terminal operates in a single receiver mode in a good wireless environment but switches from the single receiver mode to the dual receiver mode when the CINR or RSSI falls below a preset threshold.

However, the conventional dual-receiver mobile terminal suffers from frequent switching between the single- and dual-receiver modes when the CINR or RSSI varies around the threshold, thus increasing power consumption. That is, use of the dual-receiver mode when not needed results in increased power consumption.

SUMMARY OF THE INVENTION

In order to solve the above problems, an object of the present invention is to provide a method for selecting a receiver mode of a mobile terminal with two receivers that allows effective selection between a single receiver mode and a dual receiver mode, thus maintaining stable reception sensitivity regardless of a channel environment.

Another object of the present invention is to provide a method for selecting a receiver mode of a mobile terminal with two receivers that can reduce power consumption by preventing unnecessary switching between modes.

Another object of the present invention is to provide a method for selecting a receiver mode of a mobile terminal with two receivers that can reduce power consumption while maintaining stable reception sensitivity by allowing the mobile terminal to operate in a single receiver mode in high and intermediate electric field areas and in a dual receiver mode in a low electric field area.

In order to achieve the above objects, according to an exemplary aspect of the present invention, there is provided a method for selecting a receiver mode of a wireless communication terminal having at least two receivers, the method including computing at least one parameter for determining the receiver mode from a received signal; comparing the at least one parameter with a preset threshold; and selecting one only of a single receiver mode in which either of the two receivers is activated and a dual receiver mode in which both of the receivers are activated according to the comparison result.

In accordance with another exemplary aspect of the present invention, there is provided a method for selecting a receiver mode of a wireless communication terminal having two receivers and that is capable of receiving a signal using either or both of the two receivers depending on a channel environment, the method including computing Received Signal Strength Indicator (RSSI), Carrier to Interference plus Noise Ratio (CINR), and Bit Error Rate (BER) from a received signal; determining whether the RSSI is greater than or equal to a first RSSI threshold; activating, if the RSSI is less than the first RSSI threshold, both of the receivers; determining, if the RSSI is greater than or equal to the first RSSI threshold, whether the RSSI is greater than or equal to a second RSSI threshold; and activating, if the RSSI is greater than or equal to the second RSSI threshold, either of the two receivers.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Hereinafter, exemplary embodiments of the present invention are described in detail with reference to the accompanying drawings. Elements necessary to understand the operation of a mobile communication terminal are described below. Detailed description of well-known functions and constructions incorporated herein may be omitted to avoid obscuring the subject matter of the present invention.

Particular terms are defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

While, for convenience of explanation, a mobile Internet system such as Wireless Broadband (WiBro) system is herein used according to an exemplary embodiment of the present invention, it will be obvious to those skilled in the art that the system may include other networks that are capable of providing Internet Protocol (IP)-based packet services to subscribers, such as an Institute of Electrical and Electronics Engineers (IEEE) 802.1x- or IEEE 802.2x-based Wireless Local Area Network (WLAN), public wireless networks such as Global System for Mobile communication (GSM), General Packet Radio Service (GPRS), Enhanced Data GSM Environment (EDGE), Universal Mobile Telecommunications System (UMTS), Code Division Multiple Access (CDMA), Wideband Code Division Multiple Access (WCDMA), Wireless Fidelity (Wi-Fi) and 3rd Generation Partnership Project (3GPP), and expansions and modifications of the above networks.

Further, to clarify the subject matter of the present invention and to aid in the understanding thereof, a mobile terminal used herein supports more than two modes and can be connected to a communication network such as a common mobile communication network, WLAN, or mobile Internet.

While a mobile terminal is herein used according to an exemplary embodiment of the present invention, it will be obvious to those skilled in the art that the mobile terminal may be any type of information communication device and multimedia device or an equivalent thereof, including a digital broadcasting terminal, a Personal Digital Assistant (PDA), a Smart Phone, an International Mobile Telecommunication 2000 (IMT-2000) terminal, a CDMA terminal, a WCDMA terminal, GSM terminal, a Universal Mobile Telecommunication Service (UMTS) terminal, a cellular phone, a Palmtop computer, and a notebook computer.

Figure 1:
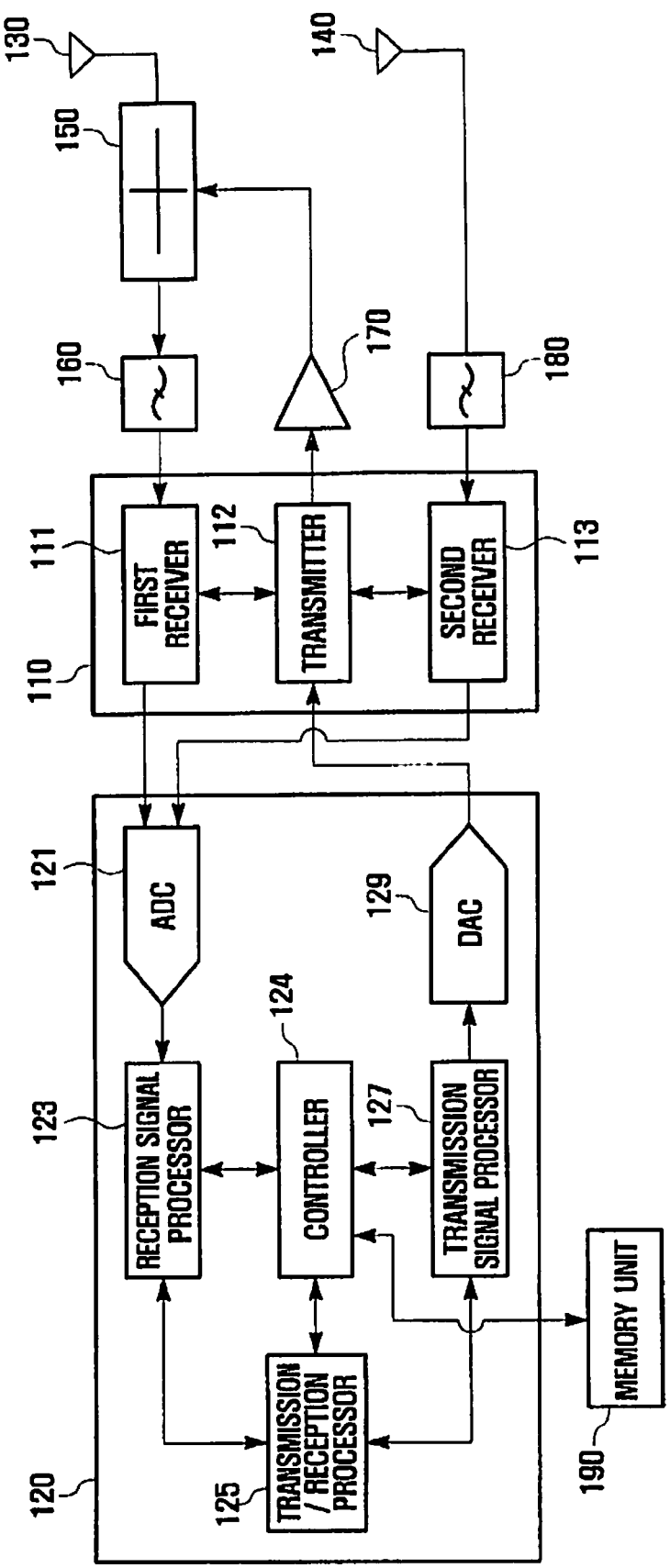
FIG. 1 is a block diagram illustrating a configuration of a mobile terminal having two receivers (herein a dual-receiver mobile terminal) according to an exemplary embodiment of the present invention.

FIG. 1 is a block diagram illustrating a configuration of a mobile terminal having two receivers (Herein A dual-receiver mobile terminal) according to an exemplary embodiment of the present invention.

Referring to FIG. 1, the dual-receiver mobile terminal includes a baseband module 110 and a logic module 120. The baseband module 110 includes a first receiver 111 that down-converts a signal received from a first antenna 130 connected to the first receiver 111 to output the resulting signal to the logic module 120, a transmitter 112 that up-converts a signal input from the logic module 120 to transmit the resulting signal via the first antenna 130 connected to the transmitter 112, and a second receiver 113 that down-converts a signal received through a second antenna 140 connected to the second receiver 113 to output the resulting signal to the logic module 120.

The first antenna 130 is connected to the first receiver 111 and the transmitter 112 via a switch 150. That is, the first antenna 130 is connected to the first receiver 111 when the switch 150 changes to a receive mode, and is connected to the transmitter 112 when the switch 150 changes to a transmit mode.

The dual-receiver mobile terminal further includes a first band-pass filter 160 that is interposed between the first receiver 111 and the switch 150 to filter out a mobile Internet (for example, WiBro) signal, an amplifier that is disposed between the transmitter 112 and the switch 150 to amplify a signal being transmitted, and a second band-pass filter 180 that is interposed between the second receiver 113 and the second antenna 140 to filter out a WiBro signal.

The logic module 120 includes an Analog-to-Digital Converter (ADC) 121, a reception signal processor 123, a transmission/reception processor 125, a transmission signal processor 127, a Digital-to-Analog Converter (DAC) 129, and a controller 124. The ADC 121 converts an analog signal received from at least one of the first and second receivers 111 and 113 after down-conversion therein into a digital signal. The reception signal processor 123 reconstructs the digital signal output from the ADC 121 into an upper layer signal. The transmission/reception processor 125 delivers the upper layer signal output from the reception signal processor 123 to an upper layer and quantizes an upper layer signal input from an upper layer into a digital signal. The transmission signal processor 127 processes a digital transmission signal received from the transmission/reception processor 125 to output the resulting signal as a transmission signal. The DAC 129 converts the transmission signal to an analog signal and outputs the analog signal to the transmitter 112 of the baseband module 110. The controller 124 controls the operations of the reception signal processor 123, the transmission signal processor 127, and the transmission/reception processor 125.

The dual-receiver mobile terminal further includes a memory unit 190 that is connected to the controller 124 to store programs necessary for operating the mobile terminal, settings and parameters for the mobile terminal, and application data generated while executing the programs.

The mobile terminal having the above configuration determines a receiver mode based on periodically measured Received Signal Strength Indicator (RSSI), Carrier to Interference plus Noise Ratio (CINR), and Bit Error Rate (BER). A method for selecting a receiver mode of a dual-receiver mobile terminal according to an exemplary embodiment is described in detail below.

First, a mobile terminal monitors a received signal to periodically measure an RSSI, and stores the RSSI in a predetermined register of the memory unit 190.

If the RSSI values cumulatively measured for each of a predetermined number of times are greater than or equal to a preset second threshold (e.g. −80 dBm) are greater than or equal to the predetermined number of times, the mobile terminal maintains a single receiver mode.

Conversely, if the measured RSSI values are less than the second threshold for the predetermined number of times, the mobile terminal measures a BER to check whether the BER is less than a preset third threshold (e.g. 1%) and stores the BER in a predetermined register.

If the RSSI is less than the second threshold (e.g. −80 dBm) and the BER is less than the third threshold, the mobile terminal maintains the single receiver mode. Conversely, if the RSSI is less than the second threshold (e.g. −80 dBm) and the BER is greater than or equal to the third threshold (e.g. 1%), the mobile terminal determines whether a CINR is greater than a fourth threshold (e.g. 6 dB).

If the RSSI is less than the second threshold, the BER is greater than or equal to the third threshold, and the CINR is greater than or equal to the fourth threshold, the mobile terminal maintains the single receiver mode.

If the RSSI is less than the second threshold, the BER is greater than or equal to the third threshold, and the number of times that the CINR is less than the fourth threshold is equal to a specific number of times for a predetermined time duration, the mobile terminal switches a receiver mode to a dual receiver mode.

Further, preferably, if the number of times that the RSSI values are less than a first threshold (e.g., −90 dBm) is greater than a specific number of times for a predetermined time duration, the mobile terminal promptly switches the receiver mode to the dual receiver mode. If the number of times that the RSSI values are greater than or equal to the first threshold, the mobile terminal maintains the single receiver mode.

Figure 2:
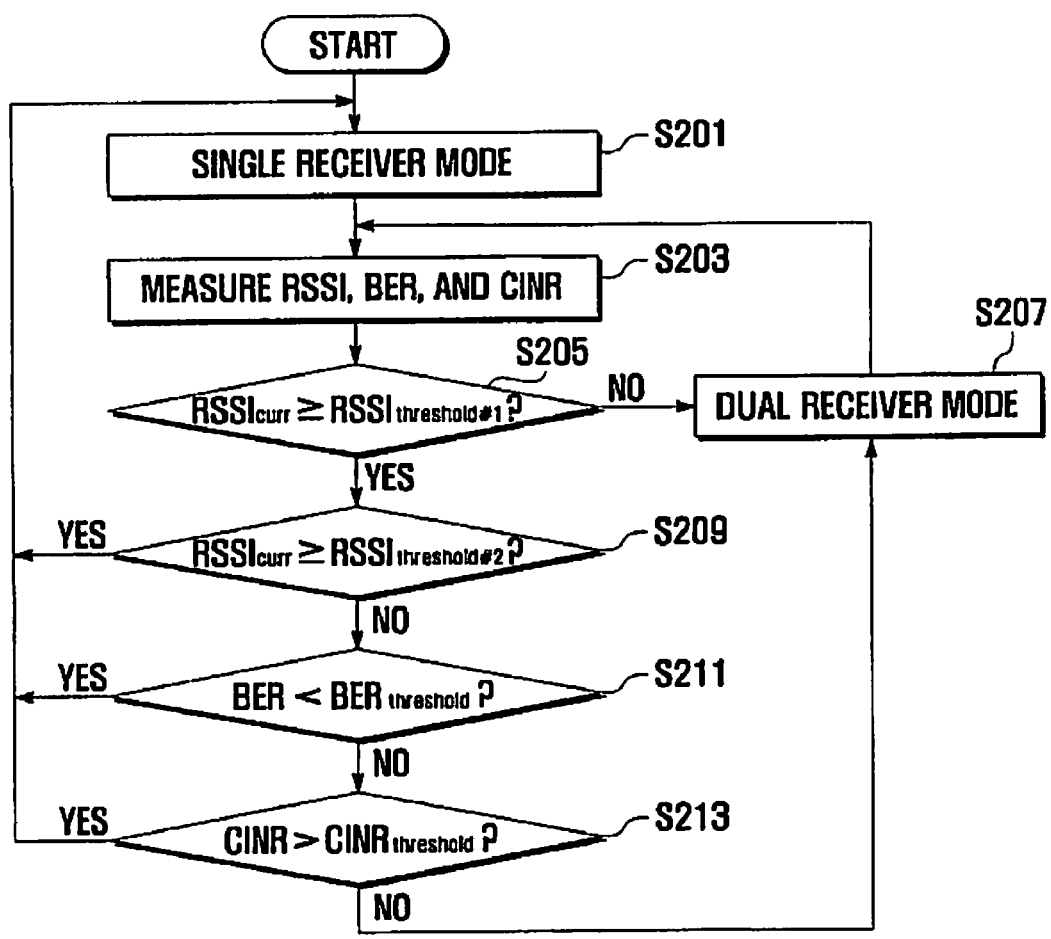
FIG. 2 is a flowchart illustrating a method for selecting a receiver mode of a dual-receiver mobile terminal according to an exemplary embodiment of the present invention.

FIG. 2 is a flowchart illustrating a method for selecting a receiver mode of a dual-receiver mobile terminal according to an exemplary embodiment of the present invention.

Referring to FIG. 2, if the power is on, the mobile terminal operates in a single receiver mode in which either of two receivers is activated, in Step 201 and periodically measures RSSI, BER, and CINR for a signal received in the single receiver mode, in Step 203.

Then, the mobile terminal determines whether the currently measured RSSI ($RSSI_{curr}$) is greater than or equal to a preset first RSSI threshold ($RSSI_{threshold\#1}$) in Step 205. While the first RSSI threshold ($RSSI_{threshold\#1}$) is set to −90 dBm in the present embodiment, it may vary depending on the types of communication system and wireless environment.

If the current RSSI ($RSSI_{curr}$) is determined to be less than the first RSSI threshold ($RSSI_{threshold\#1}$) of −90 dBm in Step 205, the mobile terminal determines whether a channel condition is poor and switches the current receiver mode from the single receiver mode to the dual receiver mode in Step 207. In the dual receiver mode, the two receivers are activated to enhance reception sensitivity.

Otherwise, if the current RSSI ($RSSI_{curr}$) is greater than or equal to −90 dBm, the mobile terminal then determines whether the current RSSI ($RSSI_{curr}$) is greater than or equal to a second RSSI threshold ($RSSI_{threshold\#2}$) of −80 dBm (S209). While the second RSSI threshold ($RSSI_{treshold\#2}$) is set to −80 dBm in the present embodiment, it may vary depending on the types of communication system and wireless environment.

If in Step 209 it is determined that the current RSSI ($RSSI_{curr}$) is greater than or equal to −80 dBm, the mobile terminal returns to step S201 to maintain the single receiver mode.

Conversely, if the current RSSI ($RSSI_{curr}$) is less than −80 dBm, the mobile terminal determines whether an average value of BERs measured over a predetermined time duration is less than a BER threshold ($BER_{threshold}$) of 1% in Step 211. While the BER threshold ($BER_{threshold}$) is set to 1% in the present embodiment, the value may vary depending on the types of communication system and wireless environment.

If the average BER is less than 1% in Step 211, the mobile terminal returns to Step 201 to maintain the single receiver mode. Conversely, if the average BER is greater than or equal to 1%, the mobile terminal then determines whether current CINR is greater than CINR threshold ($CINR_{threshold}$) of 6 dB in Step 213. While the CINR threshold ($CINR_{threshold}$) is set to 6 dB, the value may vary depending on the types of communication system and wireless environment.

If the current CINR is determined to be greater than 6 dB in Step 213, the mobile terminal returns to Step 201 to maintain the single receiver mode. Conversely, if the current CINR is not greater than 6 dB, the mobile terminal switches the receiver mode to the dual receiver mode in Step 207.

As described above, a method for selecting a receiver mode of a dual-receiver mobile terminal according to the present invention enables a receiver mode to switch between single and dual receiver modes adaptively according to a wireless environment, thus achieving stable signal reception without compromising reception sensitivity.

The present invention can also reduce power consumption caused by unnecessary switching between modes by using various parameters for determining a receiver mode.

While the present invention has been particularly shown and described with reference to embodiments thereof, it will be understood by those of ordinary skill in the art that various changes and modifications in form and details may be made without departing from the spirit and scope of the present invention, as defined by the following claims and their equivalents.

What is claimed is:

1. A method for selecting a receiver mode of a wireless communication terminal having two receivers and that is capable of receiving a signal using either or both of the two receivers depending on a channel environment, the method comprising:

computing a Received Signal Strength Indicator (RSSI), a Carrier to Interference plus Noise Ratio (CINR), and a Bit Error Rate (BER) from a received signal;

determining whether the RSSI is greater than or equal to a first RSSI threshold;

activating, if the RSSI is less than the first RSSI threshold, both of the receivers;

determining, if the RSSI is greater than or equal to the first RSSI threshold, whether the RSSI is greater than or equal to a second RSSI threshold; and activating, if the RSSI is greater than or equal to the second RSSI threshold, only one of the two receivers.

2. The method of claim 1, wherein the first RSSI threshold is less than the second RSSI threshold.

3. The method of claim 2, wherein the first and second RSSI thresholds are −90 dBm and −80 dBm, respectively.

4. The method of claim 1, further comprising:

determining, if the RSSI is less than the second RSSI threshold, whether the BER is less than a BER threshold; and activating, if the BER is less than the BER threshold, only one of the two receivers.

5. The method of claim 4, wherein the BER threshold is 1%.

6. The method of claim 4, further comprising:

determining, if the BER is not less than the BER threshold, whether the CINR is greater than a CINR threshold; and activating, if the CINR is greater than the CINR threshold, either of the two receivers.

7. The method of claim 6, further comprising activating, if the CINR is not greater than the CINR threshold, both of the receivers.

8. The method of claim 6, wherein the CINR threshold is 6 dB.

* * * * *